United States Patent [19]

Okamoto

[11] Patent Number: 5,454,115
[45] Date of Patent: Sep. 26, 1995

[54] DATA DRIVEN TYPE PROCESSOR HAVING DATA FLOW PROGRAM DIVIDED INTO PLURALITY OF SIMULTANEOUSLY EXECUTABLE PROGRAM GROUPS FOR AN N:1 READ-OUT TO MEMORY-ACCESS RATIO

[75] Inventor: Toshiya Okamoto, Kyogo, Japan

[73] Assignee: Sharp Kabushiki Kaisha, Osaka, Japan

[21] Appl. No.: 995,699

[22] Filed: Dec. 23, 1992

[30] Foreign Application Priority Data

Dec. 25, 1991 [JP] Japan ................... 3-343102

[51] Int. Cl.⁶ .................... G06F 7/00; G06F 9/38
[52] U.S. Cl. ............ 395/800; 364/232.22; 364/281.3; 364/281.4; 364/271; 364/271.4; 364/DIG. 1; 364/931.11
[58] Field of Search ................... 395/800, 375, 395/200, 275

[56] References Cited

U.S. PATENT DOCUMENTS

| | | | |
|---|---|---|---|
| 3,962,706 | 6/1976 | Dennis et al. | 395/650 |
| 4,145,733 | 3/1979 | Misunas et al. | 364/200 |
| 4,149,240 | 4/1979 | Misunas et al. | 395/800 |
| 4,153,932 | 5/1979 | Dennis et al. | 395/800 |
| 4,802,132 | 1/1989 | Ohsawa | 365/230 |
| 4,881,203 | 11/1989 | Watanabe et al. | 365/203 |
| 4,920,487 | 4/1990 | Baffes | 395/650 |
| 5,043,880 | 8/1991 | Yoshida | 395/375 |
| 5,093,919 | 3/1992 | Yoshida et al. | 395/800 |
| 5,241,683 | 8/1993 | Okamoto | 395/800 |

*Primary Examiner*—Alyssa H. Bowler
*Assistant Examiner*—Meng-Ai T. An

[57] ABSTRACT

A data driven type information processor includes a program storing unit, a junction unit, a paired data detecting unit, a branch unit and an operation processing unit. The program storing unit has a program memory divided into N regions in each of which a data flow program which is previously divided is stored. In operation, the program storing unit individually and simultaneously addresses each of the N regions based on destination information in an applied data packet to collectively read program data from the respective regions. The read N program data are sequentially applied to the operation processing unit through the junction unit, the paired data detecting unit and the branch unit.

16 Claims, 10 Drawing Sheets

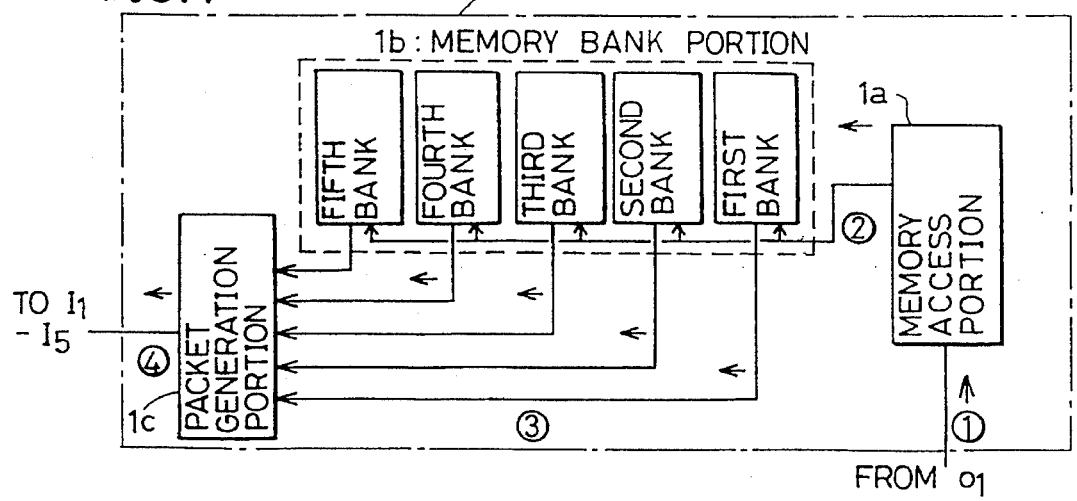

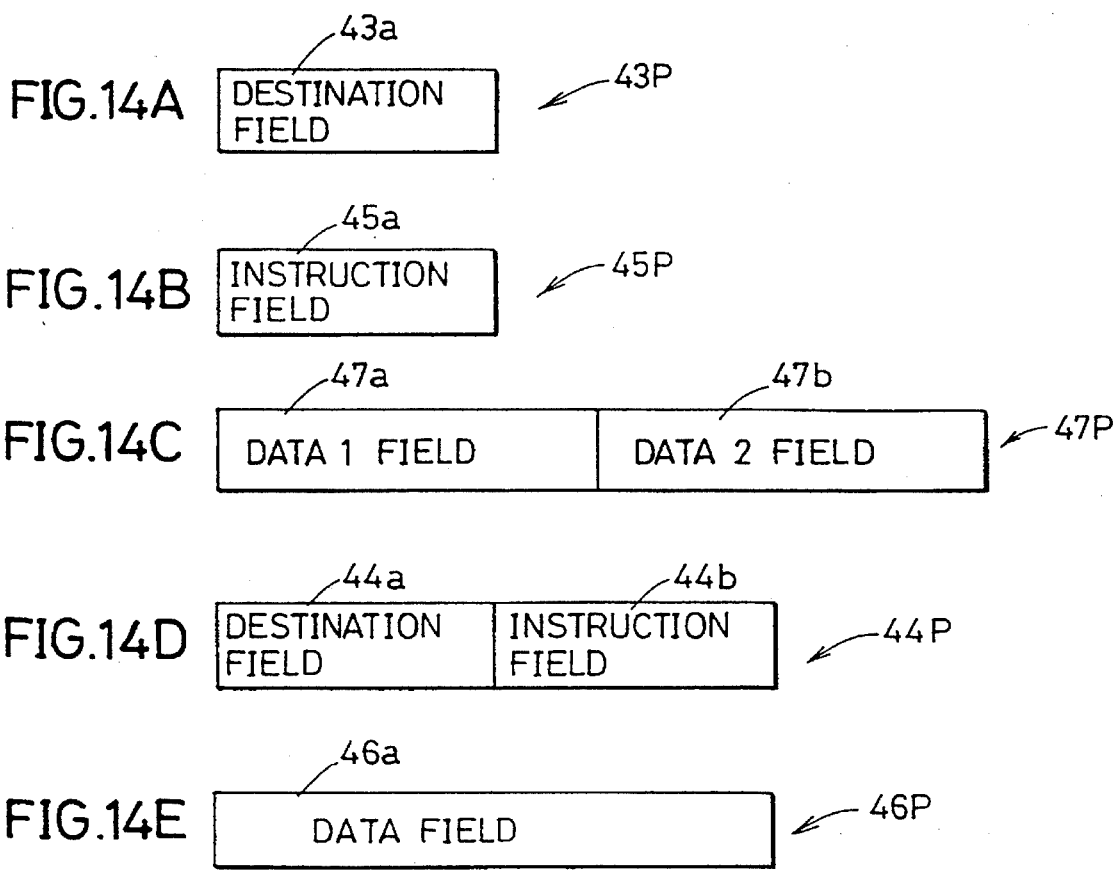

DATA DRIVEN TYPE PROCESSOR HAVING DATA FLOW PROGRAM DIVIDED INTO PLURALITY OF SIMULTANEOUSLY EXECUTABLE PROGRAM GROUPS FOR AN N:1 READ-OUT TO MEMORY-ACCESS RATIO

BACKGROUND OF THE INVENTION

1. Field of the Invention

The present invention relates generally to data driven type information processors, and more particularly, to data driven type information processors capable of reading out a plurality of instructions from a program memory by each access.

2. Description of the Background Art

In a conventional yon Neumann computer, various information in the form of a program is stored in a program memory in advance, and addresses in the program memory are sequentially specified by a program counter, so that the instructions are sequentially read out, whereby the instructions are executed.

On the other hand, a data driven type information processor is one type of non-von-Neumann computer not employing sequential execution of instructions by a program counter. Such a data driven type information processor employs architecture based on parallel processing of instructions. In the data driven type information processor wherein an execution of an instruction is enabled upon collection of data to be operated, a plurality of instructions are simultaneously driven by data, so that programs are executed in parallel in accordance with a natural flow of the data. As a result, it is considered that a time required for the operation is expected to be drastically reduced.

FIG. 8 is a block diagram showing the structure of a conventional data driven type information processor.

The data driven type information processor shown in FIG. 8 includes a program storing unit 11, a paired data detecting unit 2, an operation processing unit 3, a junction unit 211, a branch unit 22 and an input unit 23.

FIG. 9 is a diagram showing the structure of the junction unit shown in FIG. 8. FIG. 10 is a diagram showing the structure of the program storing unit shown in FIG. 8. FIG. 11 is a diagram showing a part of a conventional data flow program to be processed by the data driven type information processor shown in FIG. 8. FIG. 12 is a diagram showing a field structure of a conventional data packet to be processed by the data driven type information processor shown in FIG. 8.

A data packet 60 shown in FIG. 12 includes a destination field F1, an instruction field F2, a data 1 field F3 and a data 2 field F4. The destination field F1 stores a destination node number ND, the instruction field F2 stores an instruction code OP, and the data 1 field F3 or the data 2 field F4 stores operand data OPD.

Junction unit 211 of FIG. 8 has two input ports I1 and I2 and two output ports O1 and O2 as shown in FIG. 9. Data packets output from output ports O1 and O2 are synchronized with each other. Branch unit 22 has two input ports i1 and i2 and two output ports o1 and o2.

Program storing unit 11 of FIG. 8 includes a memory access portion 1d, a memory portion 1e and a packet generation portion 1f as shown in FIG. 10. Memory access portion 1d has an input end connected to output port o1 of branch unit 22, while packet generation portion 1f has an output end connected to input port I1 of junction unit 211. Memory portion 1e stores a data flow program 70 shown in FIG. 11. Memory access portion 1d reads a pair of a destination node number and an instruction code of the data flow program 70 stored in memory portion 1e as shown in FIG. 11 by addressing (see ② in the figure) based on a destination node number ND of a data packet applied from output port o1 through the path indicated by ① in the figure and transmits the destination node number and the instruction code to packet generation portion 1f through the path indicated by ③ in the figure. Packet generation portion 1f stores the read destination node number and instruction code in the destination field F1 and the instruction field F2 of a data packet 60, respectively, and outputs the data packet to input port I1 through the path indicated by ④ in the figure. Program storing unit 11 outputs only one instruction for each addressing in this manner.

Paired data detecting unit 2 queues applied data packets 60. More specifically, the unit detects two different data packets 60 having the same destination node number ND, stores operand data OPD, that is, the contents of the data 1 field F3 shown in FIG. 12, for example, of one of the data packets 60, in the data 2 field F4 of the other data packet and outputs said the other data packet 60.

Operation processing unit 3 performs an operation processing for operand data OPD stored in an applied data packet 60 by an instruction code OP stored therein, stores the operation result in the data 1 field F3 of the data packet 60 and outputs the data packet.

FIGS. 13A to 13H and FIGS. 14A to 14E are diagrams showing field structures of data packets flowing through the data driven type information processor shown in FIG. 8 during execution of a program.

Again with reference to FIG. 8, the two input ports of input unit 23 are connected to data transmission paths 31 and 32, respectively. Applied to data transmission path 31 is a data packet 31P comprised of a destination field 31a and an instruction field 31b as shown in FIG. 13A. Applied to data transmission path 32 is a data packet 32P comprised of a data field 32a as shown in FIG. 13B. The two output ports of input unit 23 are connected to input ports I1 and I2 of junction unit 211 through data transmission paths 33 and 34, respectively.

The output port of program storing unit 11 is connected to a data transmission path 36. Data transmission path 36 is supplied with a data packet 36P comprised of a destination field 36a and an instruction field 36b as shown in FIG. 13C.

The output port of operation processing unit 3 is connected to a data transmission path 48 which is connected to input port I2 of junction unit 211. Data transmission path 48 is supplied with a data packet 48P comprised of a data field 48a as shown in FIG. 13D.

Two output ports O1 and O2 of junction unit 211 are connected to two input ports of paired data detecting unit 2 through data transmission paths 37 and 38, respectively. Data transmission path 37 is supplied with a data packet 37P comprised of a destination field 37a and an instruction field 37b as shown in FIG. 13E. Data transmission path 38 is supplied with a data packet 38P comprised of a data field 38a as shown in FIG. 13F.

The two output ports of paired data detecting unit 2 are connected to two input ports i1 and i2 of branch unit 22 through data transmission paths 41 and 42, respectively. Data transmission path 41 is supplied with a data packet 41P comprised of a destination field 41a and an instruction field 41b as shown in FIG. 13G. Data transmission path 42 is supplied with a data packet 42P comprised of a data 1 field 42a and a data 2 field 42b as shown in FIG. 13H.

One output port o1 of branch unit 22 is connected to the input port of program storing unit 11 through a data transmission path 43 and to the one input port of operation processing unit 3 through a data transmission path 45. Branch unit 22 is connected outside the processor through a data transmission path 44. The other output port o2 of branch unit 22 is connected outside the processor through a data transmission path 46 and to the other input port of operation processing unit 3 through a data transmission path 47. Data transmission path 43 is supplied with a data packet 43P comprised of a destination field 43a as shown in FIG. 14A and data transmission path 45 is supplied with a data packet 45P comprised of an instruction field 45a as shown in FIG. 14B. Data transmission path 47 is supplied with a data packet 47P comprised of a data 1 field 47a and a data 2 field 47b as shown in FIG. 14C. Data transmission path 44 is supplied with a data packet 44P comprised of a destination field 44a and an instruction field 44b as shown in FIG. 14D, while data transmission path 46 is supplied with a data packet 46P comprised of a data field 46a as shown in FIG. 14E.

FIG. 15 is a diagram illustrating operations in the data driven type information processor shown in FIG. 8 in accordance with a flow of various data packets during execution of a program. With reference to FIG. 15, operation of a conventional data driven type information processor will be described.

First, a pair of data packets 31P and 32P are applied to input unit 23. These data packets 31P and 32P are transmitted to input ports I1 and I2 of junction unit 211, respectively. At an initial time point, these data packets 31P and 32P are transmitted without being operated as data packets 37P and 38P, respectively, from output ports O1 and O2 to paired data detecting unit 2. When two different pairs of data packets having the same destination node number are detected by paired data detecting unit 2, a pair of data packets 41P and 42P are output therefrom.

Branch unit 22 selects continuation of an internal processing related to these data packets 41P and 42P or transmission of these data packets 41P and 42P outside the apparatus. If the internal processing is to be continued, branch unit 22 separates a data packet 41P into a data packet 43P comprised of a destination field and a data packet 45P comprised of an instruction field, and transmits data packet 43P to program storing unit 11 and data packet 45P to operation processing unit 3. In addition, branch unit 22 transmits data packet 42P as a data packet 47P to operation processing unit 3. When data packets 41P and 42P are transmitted outside the apparatus, data packet 41P is not separated. Data packet 41P transmitted outside the apparatus is output as a data packet 44P and in the same manner, data packet 42P is output as a data packet 46P.

Operation processing unit 3 performs an operation processing related to one or two operand data OPD stored in data packet 47P based on an operation code OP stored in data packet 45P, and outputs data packet 48P storing only the data indicative of the operation result.

Meanwhile, program storing unit 11 reads a destination node number and an instruction code in a subsequent order of the data flow program 70 shown in FIG. 11 by addressing based on a destination node number ND stored in data packet 43P. Output to data transmission path 36 is data packet 36P including the destination code number and the instruction code read from program storing unit 11. Hereinafter, as respective data packets sequentially circulate through respective processing units in the same manner as described above, a processing in accordance with the data flow program 70 proceeds.

Junction unit 211 arbitrates between externally applied data packets and internally processed data packet. When the internally processed data packet 36P contend with the externally applied data packet 31P, the internally processed data packet 36P is given priority to be output from output port O1. The data packet, to which priority is not given, is kept waiting until no contender appears.

When the internally processed data packet 36P is selected at output port O1, data packet 48P output from operation processing unit 3 is selected at output port O2, and when the externally applied data packet 31P is selected at output port O1, the externally applied data packet 32P is selected at output port O2. Data packet 38P is output in synchronization with data packet 37P. Unselected data packets are kept waiting.

In data packet 42P output from paired data detecting unit 2, when a corresponding instruction code OP indicates one operand instruction, operand data OPD is stored only in the data 1 field 42a, while operand data OPD are stored in the data 1 field 42a and the data 2 field 42b when the corresponding instruction code OP indicates two operand instructions.

As described in the foregoing, it is possible to combine (merge) a data packet newly output from program storing unit 11 with a corresponding data packet processed by operation processing unit 3 without applying special identification information to a data packet separated by branch unit 22.

In recent years, for realizing a particularly desired improvement in a processing rate of a data driven type information processor, an operation processing rate of operation processing unit 3 should be first increased. Since operation processing unit 3 carries out one operation processing in response to an input of one instruction as described above, the unit has to wait (waiting time) for a subsequent input of one instruction after the completion of the operation processing. In order to increase an operation processing rate of operation processing unit 3, therefore, the waiting time should be eliminated by applying a large amount of instructions per unit time to operation processing unit 3, thereby increasing the amount of operation processings per unit time by operation processing unit 3. In other words, since program storing unit 11 is a supplier of instructions to operation processing unit 3, an instruction supplying capacity of program storing unit 11, that is, the amount of instructions to be read from memory portion 1e per unit time should be increased. Since program storing unit 11 reads out only one instruction per access as described above, read of a large amount of instructions per unit time inevitably requires speed-up of the operation of program storing unit 11. However, an information processor using a high-speed accessible memory as program storing unit 11 is expensive itself or a system including such processor is too expensive to be practical. With a high-speed memory, a processing rate of a processor cannot be greater than an access rate of a program storing unit.

SUMMARY OF THE INVENTION

An object of the present invention is to provide a data driven type information processor whose processing capacity can be increased by increasing the number of operation instructions to be supplied to an operation processing unit of the processor per unit time.

In order to achieve the above-described object, a data driven type information processor according to the present invention includes a program storing unit, an operation processing unit, a junction unit, a paired data detecting unit and a supply unit. The program storing unit stores a data flow program which is divided into a plurality of program groups, accesses the plurality of program groups in parallel based on one destination information output from the supply unit to read out a pair of information including destination information and instruction information in a subsequent order from among the respective program groups, and applies the read information pair to the junction unit. The operation processing unit performs an operation processing concerning data supplied from the supply unit based on the instruction information provided from the supply unit, and applies data indicative of the operation result to the junction unit. The junction unit sequentially merges thus applied plurality of information pairs with corresponding data, and applies the merged information pair and data to the paired data detecting unit. The paired data detecting unit receives the information pair and its corresponding data merged at the junction unit, and applies one or a plurality of data pairs corresponding to the same destination information to the supply unit together with an information pair including the destination information. The supply unit receives applied information pair and data, and applies destination information of the received information pair to the program storing unit and applies the received data and the instruction information in the received information pair to the operation unit. Therefore, since a plurality of instruction information are read from the program storing unit and applied to the operation processing unit by one access based on one destination information, the number of instructions applied to the operation processing unit per unit time is increased to improve a rate of operation of the operation processing unit, thereby enhancing a processing capability of the information processor.

In addition, read of a plurality of instruction information from the program storing unit by one access is possible as described above, which improves an access efficiency of the program storing unit. Since the improvement of the access efficiency is achieved without using a high-speed accessible memory, the cost of the information processor is not increased. Furthermore, the number of instruction information read from the program storing unit by one access is variable according to the number of program groups in the program storing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the structure of a program storing unit of a data driven type information processor according to one embodiment of the present invention.

FIG. 2 is a diagram illustrating a data flow program to be processed by the data driven type information processor according to one embodiment of the present invention and a method of storing the program.

FIGS. 14A, 14B, 14C, 14D and 14E are diagrams showing field structures of data packets flowing through the data driven type information processor shown in FIG. 8 during execution of the program.

DESCRIPTION OF THE PREFERRED EMBODIMENT

One embodiment of the present invention will be described in detail in the following with reference to drawings.

Figure 3:
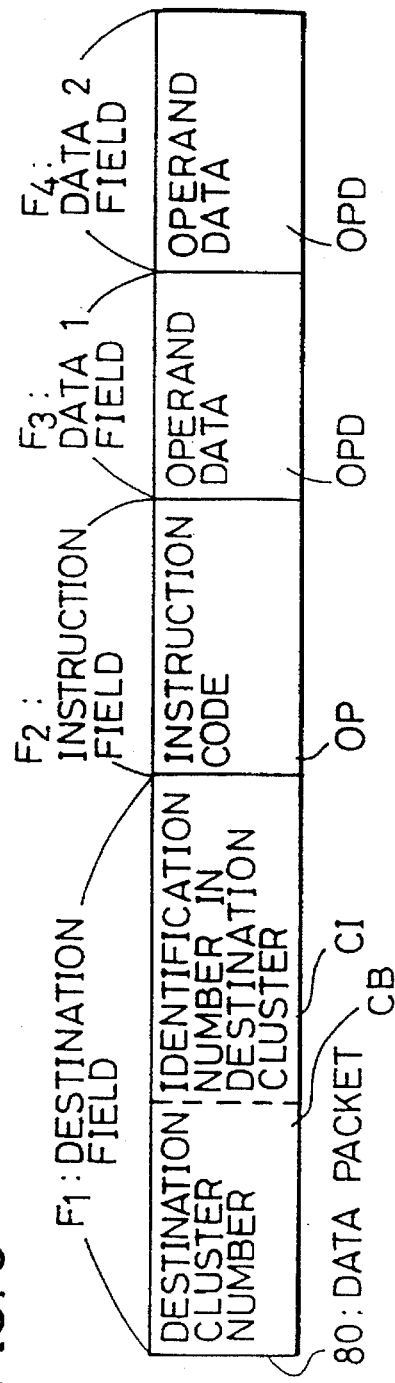
FIG. 3 is a diagram showing a field structure of a data packet to be processed by the data driven type information processor according to one embodiment of the present invention.
Figure 4A:
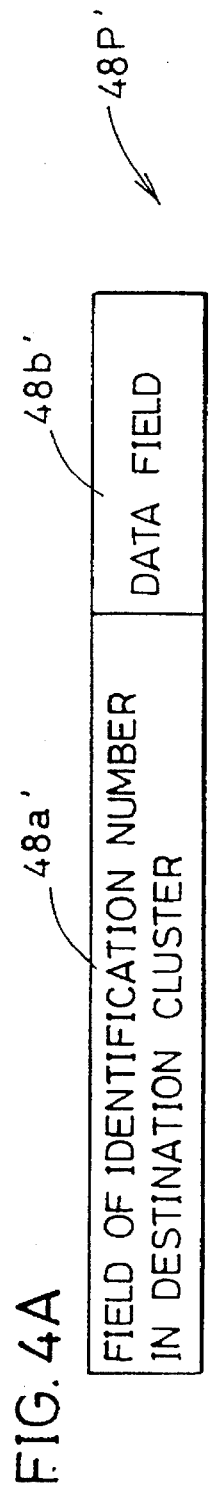
FIGS. 4A and 4B are diagrams showing field structures of a part of a data packet group flowing through the data driven type information processor according to one embodiment of the present invention during execution of the program.
Figure 4B:
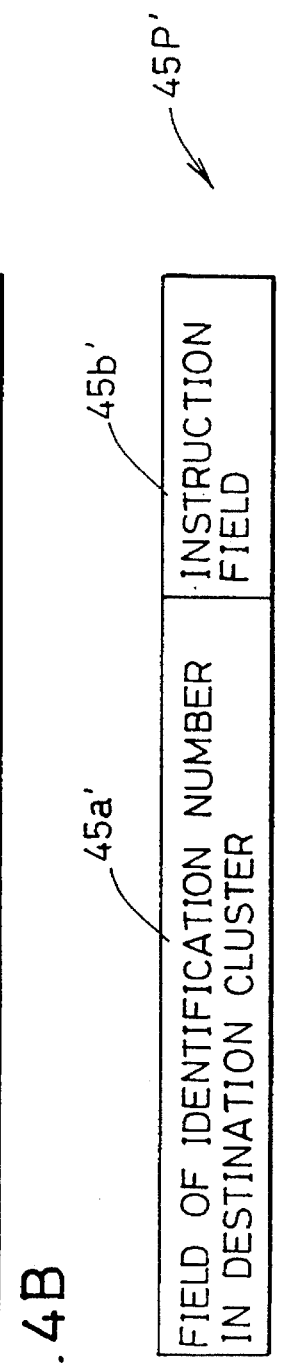

Shown in FIG. 1 is a block structure of a program storing unit 1 in a data driven type information processor according to one embodiment of the present invention, FIG. 2 shows a data flow program 90 stored in program storing unit 1 of FIG. 1 and to be processed by the information processor, and FIG. 3 shows a field structure of a data packet circulating through the data driven type information processor according to one embodiment of the present invention. FIGS. 4A and 4B show field structures of a part of data packet groups flowing through the data driven type information processor according to one embodiment of the present invention during execution of the program.

Figure 5:
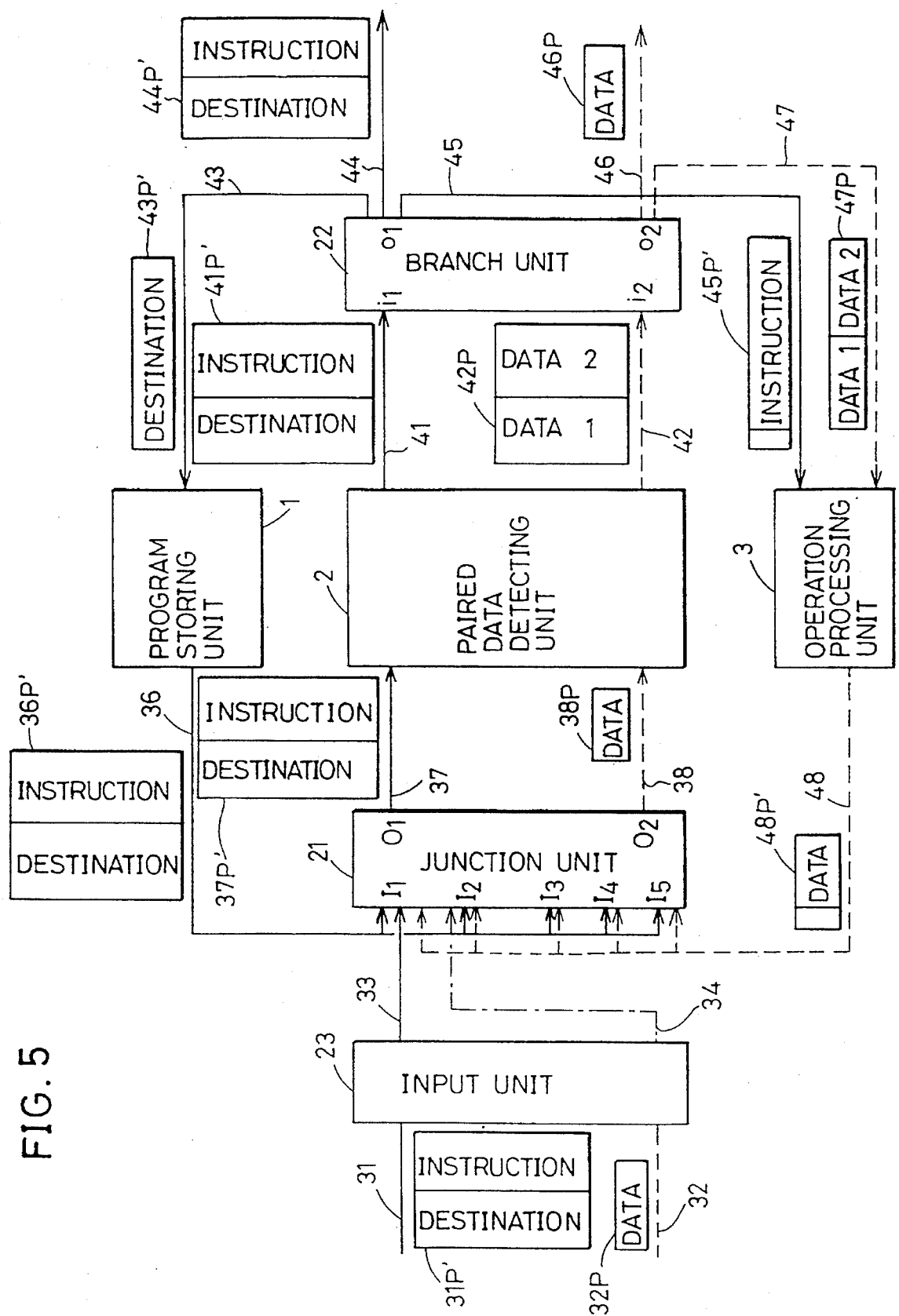
FIG. 5 is a diagram illustrating, in accordance with a flow of various data packets, operations of the data driven type information processor according to one embodiment of the present invention during the execution of the program.
Figure 6:
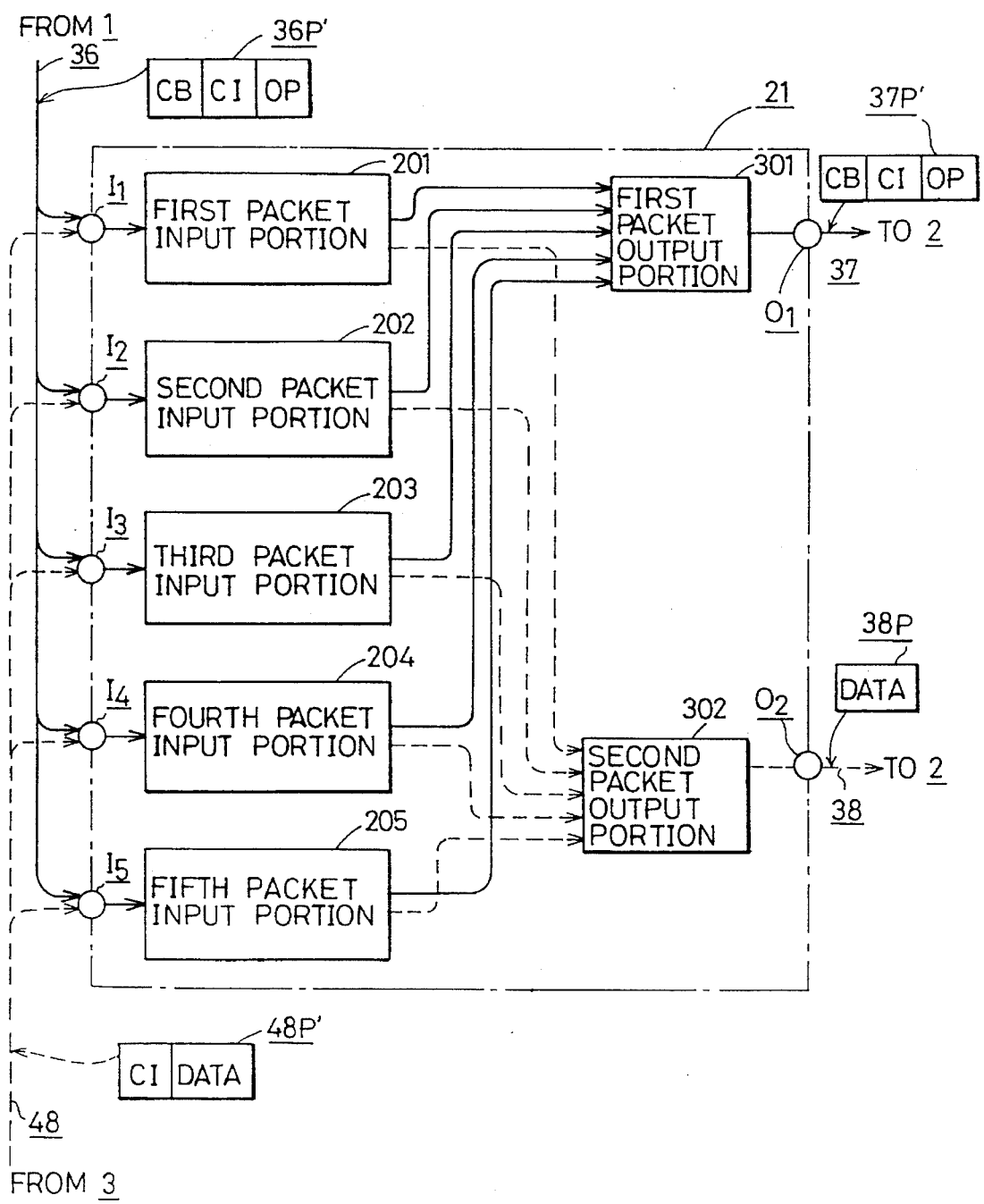
FIG. 6 is a diagram showing a block structure of a junction unit according to one embodiment of the present invention.

FIG. 5 is a diagram illustrating, following a flow of various data packets, operations of the data driven type information processor according to one embodiment of the present invention during execution of the program. The data driven type information processor shown in FIG. 5 includes a program storing unit 1, a paired data detecting unit 2, an operation processing unit 3, a junction unit 21, a branch unit 22 and an input unit 23. Junction unit 21 has five input ports I1–I5 and two output ports O1 and O2 as shown in the figure. Data packet output from output ports O1 and O2 are synchronized with each other. The block structure of junction unit 21 is shown in FIG. 6. Junction unit 21 further includes first to fifth packet input portions 201–205 provided corresponding to input ports I1–I5 and first and second packet output portions 301 and 302 provided corresponding to output ports O1 and O2 as shown in the figure. Junction unit 21 will be described in more detail later. Branch unit 22 has two input ports i1 and i2 and two output ports o1 and o2 similarly to a conventional branch unit. Program storing unit 1 will be described in more detail later. Operation processing unit 3 and input unit 23 are structured to operate in the same manner as in a conventional processor.

Program storing unit 1 of FIG. 1 includes a memory access portion 1a having its input terminal connected to output port o1 of branch unit 22, a memory bank portion 1b, and a packet generation portion 1c having output terminals connected to input ports I1 to I5 of junction unit 21. Memory bank portion 1b is a region where the data flow program 90 is stored and further divided into first to fifth bank program storing regions. The first to the fifth banks store the divided data flow program 90. Memory access portion 1a simultaneously and individually accesses the first to the fifth banks by addressing based on destination information stored in an applied data packet. The program data read from a designated address of each bank in this access is applied to packet generation portion 1c. Packet generation portion 1c generates data packets from the applied five program data and sequentially outputs the generated data packets in the order of application (read). The data flow programs stored in the first to the fifth banks in memory bank portion 1b will be described later.

A data packet 80 of FIG. 3 includes a destination field F1, an instruction field F2, a data 1 field F3 and a data 2 field F4 similarly to a conventional data packet. Similar to a conventional data packet, the instruction field F2 stores an instruction code OP, and the data 1 field F3 and the data 2 field F4 store operand data OPD. The destination field F1 of data packet 80 according to the present embodiment stores a destination cluster number CB and an identification number CI in destination cluster in a subsequent order. The destination field F1 has a fixed bit width and a region for storing a destination cluster number CB and an identification number CI in destination cluster has a variable bit width. Bit lengths of the destination cluster number CB and the identification number CI in destination cluster are variable according to the accessible capacity of the memory for each time, that is, the number of memory banks of memory bank 1b.

The data flow program 90 of FIG. 2 is stored in memory bank portion 1b. Each row of the data flow program 90 is equivalent to program data including a cluster number Cb, an identification number Ci in cluster and an instruction code OP. "Cluster" is a name of a group of program data, the group including a plurality of simultaneously executable program data. The data flow program 90 includes (N+1) clusters, that is, clusters 0 to N. When the data flow program 90 is stored in memory bank portion 1b, memory access portion 1a is allowed to read all of five program data included in a cluster corresponding to a cluster number (one of clusters 0–N) designated by one addressing based on destination information stored in an applied data packet, that is, based on a destination cluster number CB.

A data flow program 90 storage state in memory bank portion 1b will be described in the following. The data flow program 90 of FIG. 2 is divided into clusters 0–N. Each cluster includes five program data identified by identification number Ci in cluster. Memory bank portion 1b is therefore divided into five banks. When the data flow program 90 is stored in memory bank portion 1b, first program data in each cluster of the clusters 0–N is stored in the first bank, second program data in each of the clusters 0–N is stored in the second bank, third program data in each of the clusters 0–N is stored in the third bank, fourth program data in each of the clusters 0–N is stored in the fourth bank and fifth program data in each of the clusters 0–N is stored in the fifth bank. As described in the forgoing, the number of banks in memory bank portion 1b is determined by the number of program data included in each cluster of the data flow program 90, that is, by the maximum number of identification numbers in the cluster, while a capacity (depth) of each bank is determined by the number of clusters included in the data flow program 90.

Reading the data flow program 90 from program storing unit 1 according to the present embodiment will be described with reference to FIG. 1. A data packet is applied to memory access portion 1a through a path ① of FIG. 1. Memory access portion 1a accesses each bank of memory bank portion 1b in parallel by addressing (path ②) based on a destination cluster numbers CB stored in the applied data packet. Memory bank portion 1b reads program data stored in an addressed region in each bank. Therefore, simultaneously executable five program data are read from memory bank portion 1b by one access. The read five program data are sequentially transmitted to packet generating portion 1c through a path ③. Packet generating portion 1c makes each applied program data into a data packet, and transmits respective data packets made through a path ④ to input port ports I1–I5 of junction unit 21 in the same order as the data packets are read. Similar to a conventional processor, the five program data simultaneously read from program storing unit 1 in a manner as described above are made into data packets at junction unit 21 and applied to paired data detecting unit 2 in synchronization with data from operation processing unit 3.

FIG. 5 shows a data driven type information processor and data packets circulating therethrough. Out of the data packets shown, those having related, albeit different, field structures as those of the conventional data packets shown in FIGS. 13A–13H and FIGS. 14A to 14E have "'" (apostrophe) added to the reference characters of the conventional corresponding data packet symbols shown in FIGS. 13A–13H and FIGS. 14A–14E in order to discriminate the data packets from conventional data packets.

With reference to FIG. 5, the two input ports of input portion 23 are connected to data transmission paths 31 and 32. Data transmission path 31 is supplied with a data packet 31P' comprised of a destination field and an instruction field. Data transmission path 32 is supplied with a data packet 32P comprised of a data field. Two output ports of input unit 23 are connected to input ports I1 and I2 of junction unit 21 through data transmission paths 33 and 34. The output port of program storing unit 1 is connected to input ports I1–I5 of junction unit 21 through data transmission path 36. A data packet 36P' is applied to data transmission path 36. The output port of operation processing unit 3 is connected to input ports I1–I5 of junction unit 21 through data transmission path 48. Data transmission path 48 is supplied with a data packet 48P' comprised of a field 48a' of an identification number in destination cluster which stores an identification number CI in destination cluster and a data field 48b' as shown in FIG. 4A. Two output ports O1 and O2 of junction unit 21 are connected to two input ports of paired data detecting unit 2 through data transmission paths 37 and 38, respectively. Data transmission path 37 is supplied with a data packet 37P'. Data transmission path 38 is supplied with a data packet 38P'. The two output ports of the paired data detecting unit 2 are connected to two input ports i1 and i2 of branch unit 22 through data transmission paths 41 and 42, respectively. Data transmission path 41 is supplied with a data packet 41P' and data transmission path 42 is supplied with a data packet 42P. One output port o1 of branch unit 22 is connected to the input port of program storing unit 1 through a data transmission path 43 and to one input port of operation processing unit 3 through a data transmission path 45. In addition, branch unit 22 is connected outside the processor through a data transmission path 44. The other output port o2 of branch unit 22 is connected outside the processor through a data transmission path 46 and to the other input port of operation processing unit 3 through a data transmission path 47. Data transmission path 43 is supplied with a data packet 43P' and data transmission path 45 is supplied with a data packet 45P comprised of a field 45a' of an identification number in destination cluster and an instruction field 45b' as shown in FIG. 4B. Data transmission path 47 is supplied with a data packet 47P. Data transmission path 44 is supplied with a data packet 44P', while data transmission path 46 is supplied with a data packet 46P.

Operation of the data driven type information processor according to the present embodiment will be described with reference to FIG. 5. First, a pair of data packets 31P' and 32P are applied to input unit 23. These data packets 31P' and 32P are respectively transmitted to input ports I1 and I2 of junction unit 21. At the initial time point, these data packets 31P' and 32P are sent from output ports O1 and O2 to paired data detecting unit 2 as data packets 37P' and 38P without being operated upon. When paired data detecting unit 2 detects two different data packets having the same destination information (designation cluster number CB and identification number CI in cluster), the unit sends a pair of data packets 41P' and 42P to branch unit 22.

Branch unit 22 selects continuation of an internal processing on these data packets 41P' and 42P or transmission of these data packets 41P' and 42P outside the processor. If the internal processing is to be continued, branch unit 22 separates data packet 41P' into data packet 43P' comprised of a destination field and data packet 45P' comprised of a field of an identification number in destination cluster and an instruction field, sends data packet 43P' to program storing unit 1 and data packet 45P' to operation processing unit 3. In addition, branch unit 22 sends data packet 42P as data packet 47P to operation processing unit 3. When data packets 41P' and 42P are to be sent outside the processor, data packet 41P' is not separated. Data packet 41P' to be transmitted outside the processor is output as data packet 44P' and data packet 42P is similarly output as data packet 46P.

Operation processing unit 3 performs an operation processing related to one or two operand data OPD stored in data packet 47P based on an instruction code OP stored in data packet 45P' and outputs data packet 48P' comprised of a data field storing the operation result and a field of an identification number in destination cluster. Data packet 48P' is applied in parallel to each of input ports I1–I5 of junction unit 21. Meanwhile, program storing unit 1 outputs five data packets 36P' in parallel by addressing based on a destination cluster number CB stored in data packet 43P', and the respective data packets 36P' are applied to input ports I1, I2, I3, I4 and I5 of junction unit 21 in the same order as the packets are read. Data packets 36P' and 48P' applied to each input port of junction unit 21 are applied to a packet input portion corresponding to the input port. Each of packet input portions 201–205 inputs the applied data packets 36P' and 48P', collates destination numbers CI in destination cluster in each input packet with each other and outputs each of the input packets 36P' and 48P' to packet output portions 301 and 302 according to the collation result. This collation processing will be described in the following.

Figure 7:
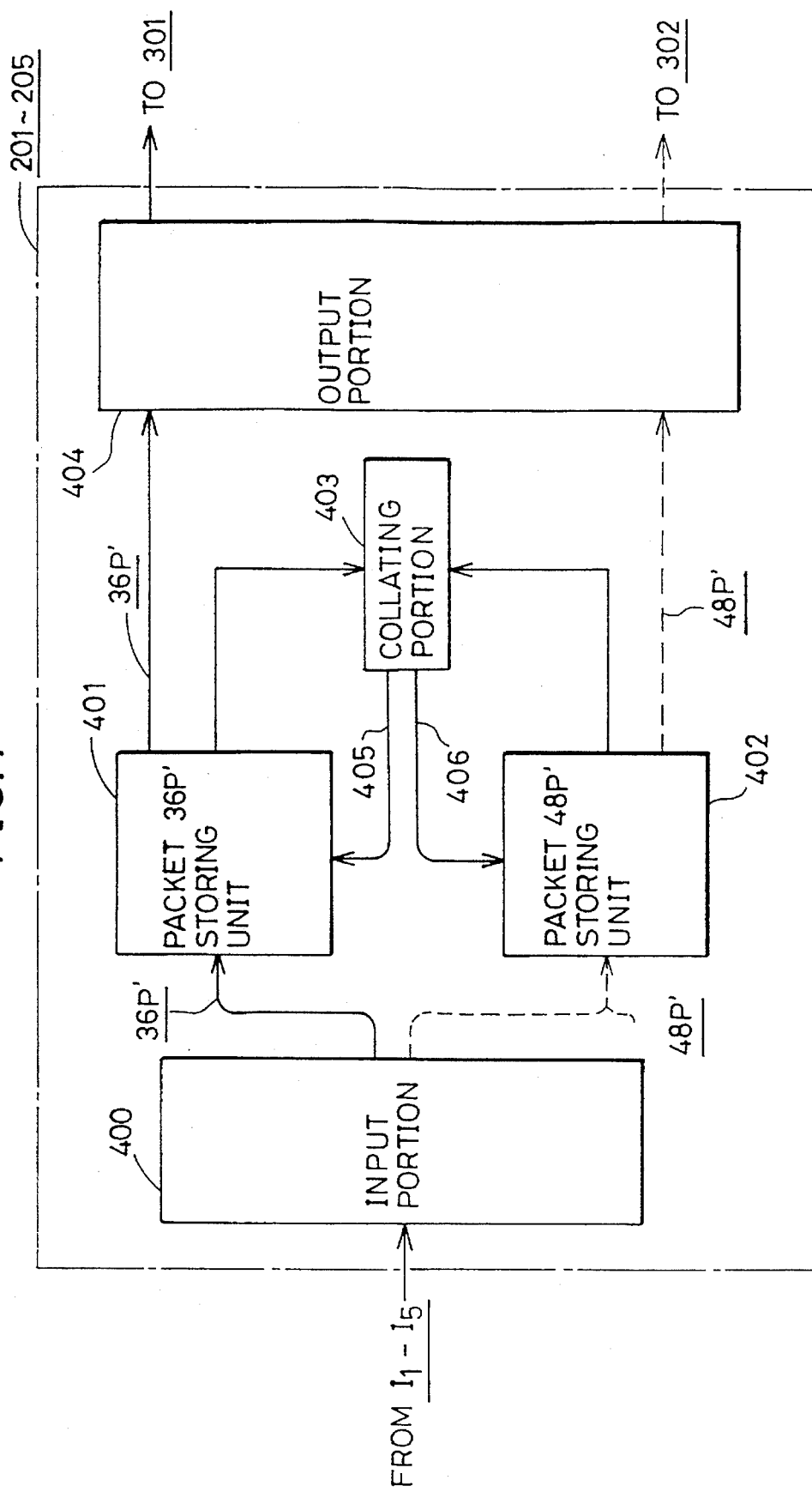
FIG. 7 is a diagram showing a block structure of first to fifth packet input portions shown in FIG. 6.
Figure 8:
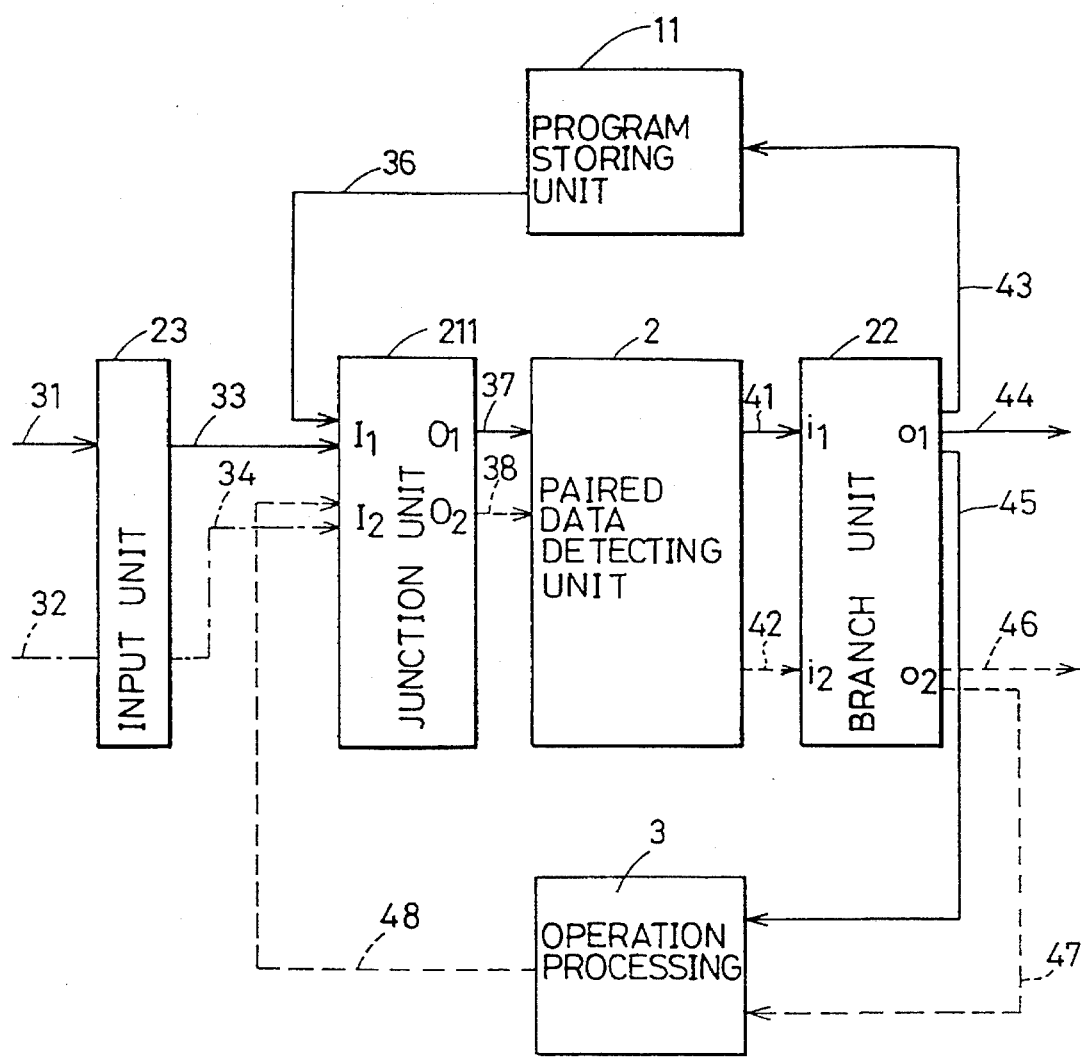
FIG. 8 is a block diagram showing the structure of a conventional data driven type information processor.
Figure 9:
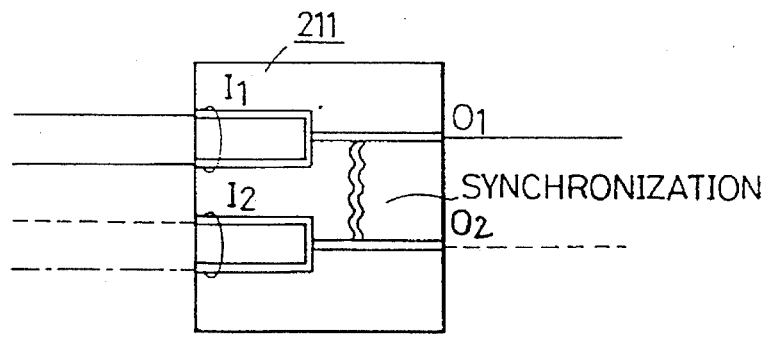
FIG. 9 is a diagram showing the structure of a junction unit shown in FIG. 8.
Figure 10:
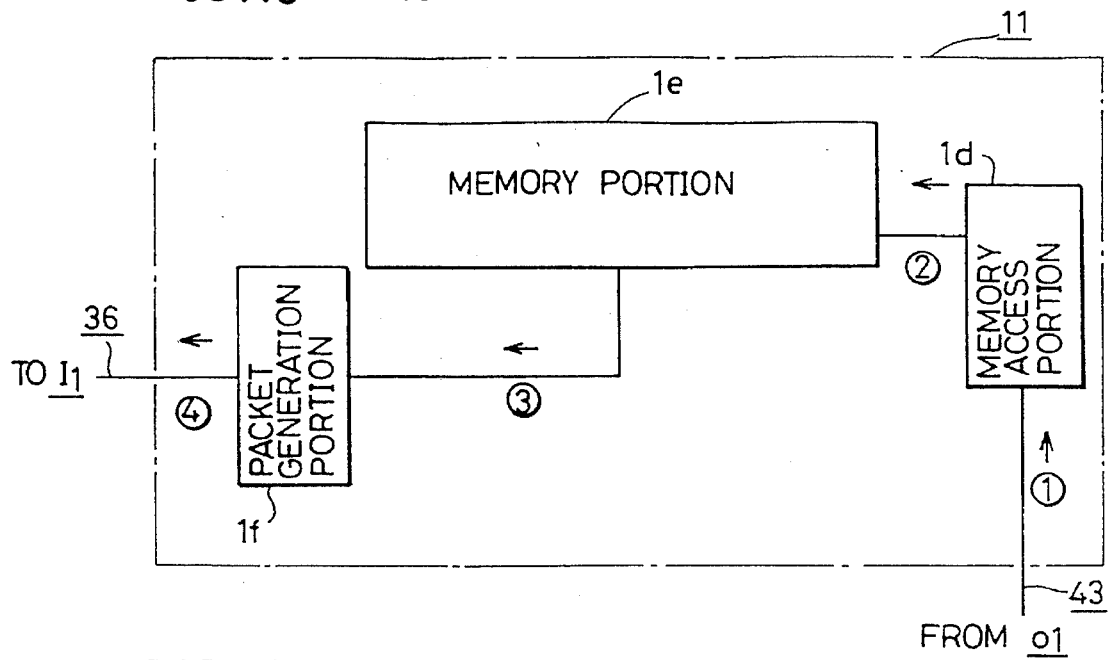
FIG. 10 is a diagram showing the structure of a program storing unit shown in FIG. 8.
Figure 11:
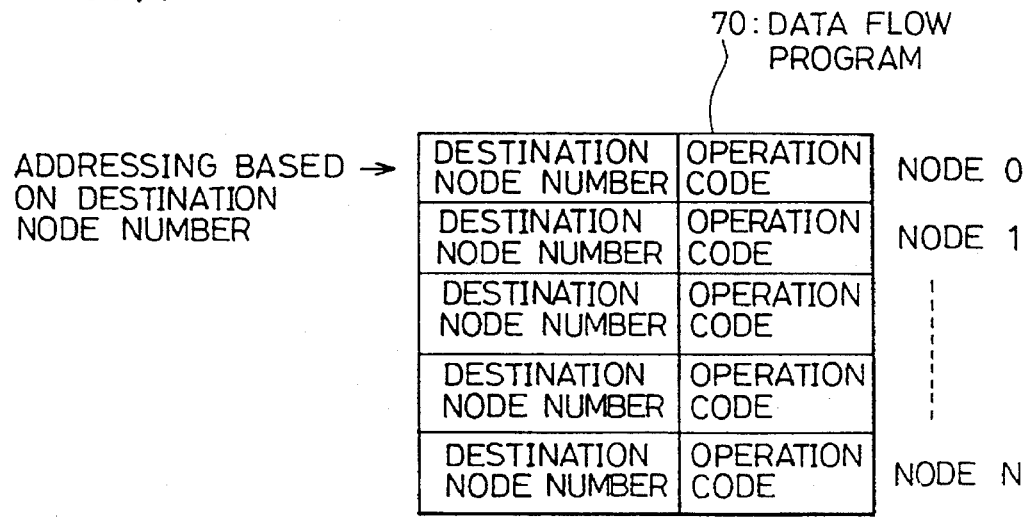
FIG. 11 is a diagram showing a conventional data flow program to be processed by the data driven type information processor shown in FIG. 8.
Figure 12:
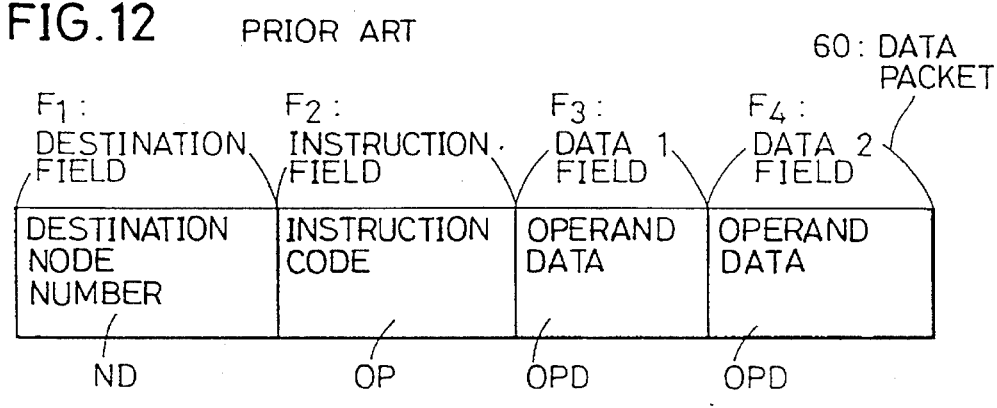
FIG. 12 is a diagram showing a field structure of a conventional data packet to be processed by the data driven type information processor shown in FIG. 8.
Figure 13A:
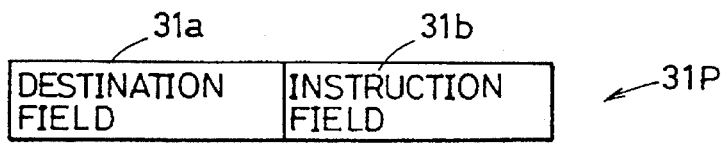
FIGS. 13A, 13B, 13C, 13D, 13E, 13F, 13G and 13H are diagrams showing field structures of data packets flowing through the data driven type information processor shown in FIG. 8 during execution of the program.
Figure 13B:
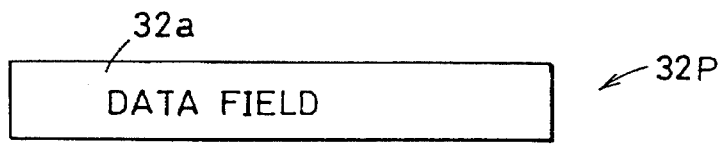
Figure 13C:
Figure 13D:
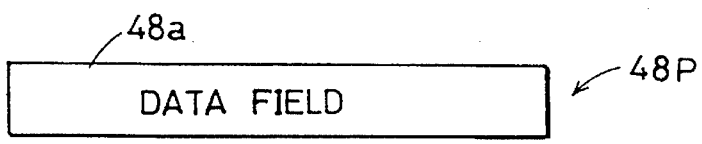
Figure 13E:
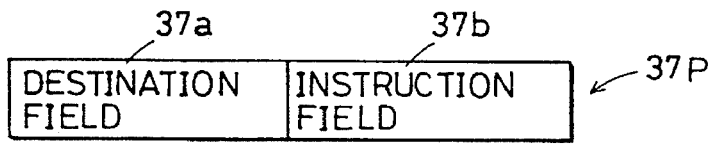
Figure 13F:
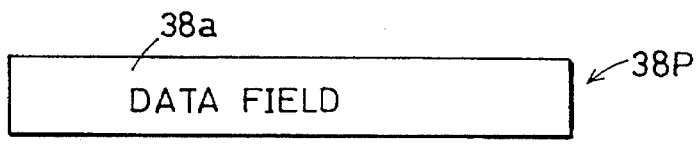
Figure 13G:
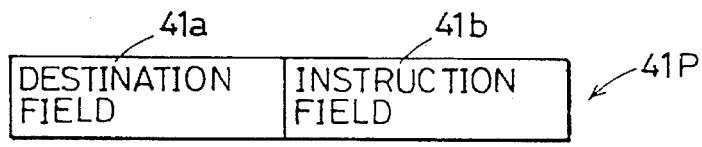
Figure 13H:
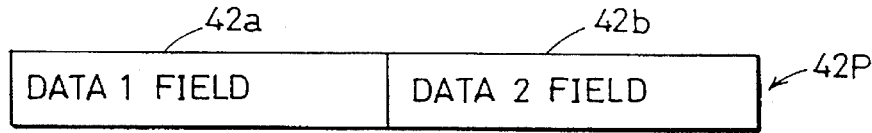
Figure 15:
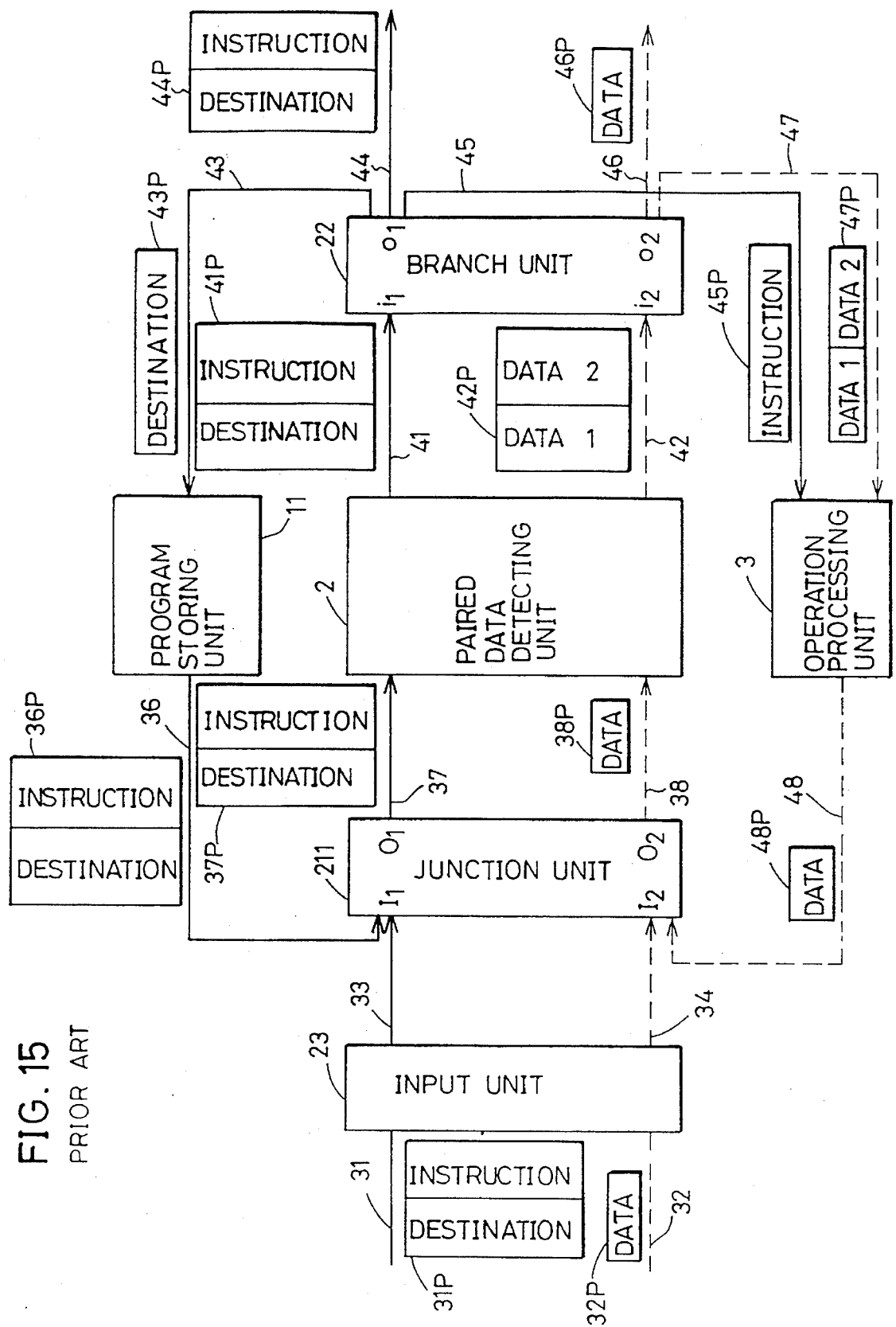
FIG. 15 is a diagram illustrating, in accordance with a flow of various data packets operations of the data driven type information processor shown in FIG. 8 during execution of the program.

FIG. 7 shows a block structure of first to fifth packet input portions 201–205 shown in FIG. 6. Each of packet input portions 201–205 has the same block structure including an input portion 400 connected to a corresponding input port, a packet 36P' storing unit 401 for temporarily storing packet 36P', a packet 48P' storing unit 402 for temporarily storing packet 48', a collating portion 403 for performing the above-described collation processing every time packet 48P' is stored in storing portion 402, and an output portion 404 for outputting the input packet 36P' to packet output portion 301 while outputting the input packet 48P' to packet output portion 302. Input portion 400 inputs the data packets 36P' and 48P' applied through its corresponding input port, and applies the packet 36P' to storing portion 401 and the applied packets 48P' to storing portion 402. Each of storing portions 401 and 402 stores an applied data packet. Collating portion 403 reads a cluster identification number CI in data packet 36P' stored in storing portion 401 and reads a cluster identification number CI in data packet 48P' stored in storing portion 402 to compare and collate the identification numbers every time the data packet 48P' is stored in storing portion 402. When match of the identification numbers is found by this collation, collating portion 403 responsively outputs storage control signals 405 and 406 to storing portions 401 and 402, respectively, and controls each of the storing portions to read a data packet stored therein and output the read data packet to output portion 404. Output portion 404 inputs packet 36P' output from storing portion 401 and outputs the packet to first packet output portion 301 while inputting packet 48P' output from storing portion 402 and outputting the packet to second packet output portion 302. Each packet output portion outputs input packets in synchronization with each other through its corresponding output port. On the other hand, when the above-described collation finds mismatch of the identification numbers, collating portion 403 responsively outputs storage control signals 405 and 406 to storing portions 401 and 402, respectively, and inhibits each storing portion from reading a data packet stored therein and outputting the read data packet to output portion 404. In particular, storing portion 401 is controlled not to input data packet 36P' applied from input portion 400 but maintain the present storage contents until the presently stored data packet 36P' is read and output to output portion 404, that is, until the collation results relating to the presently stored data packet 36P' match. Packet storing portion 402 re-writes the applied packet 48P' to have the present storage contents and stores the rewritten packet 48P' every time input portion 400 applies packet 48P'.

As described in the foregoing, junction unit 21 operates to output to paired data detecting unit 2 only data packets applied to an input port at which identification numbers CI of both data packets applied match with each other, out of input ports I1–I5. Since junction unit 21 forms data packets 36P' and 48P' applied to the input port at which identification numbers CI of the applied data packets match out of input ports I1–I5, into data packets 37P' and 38P, respectively, and outputs the data packets to paired data detecting unit 2, the destination information of the operation result data stored in data packet 48P' at this time point is updated by using the destination information stored in the corresponding data packet 36P'. Junction unit 21 arbitrates inputs between a data packet processed inside the processor and a data packet externally applied through input unit 23 in the same manner as in a conventional processor.

Queuing of two different pairs of data packets having the same destination information in paired data detecting unit 2 is carried out similarly to a conventional example, by using information stored in a destination field, that is, a destination cluster number CB and an identification number CI in the destination cluster (=destination node number). Then, program storing unit 1 reads five program data stored in a region addressed based on the destination cluster number CB stored in data packet 43P' whose pair is detected and which is branched by branch unit 22. In this manner, an operation processing following the data flow program 90 stored in program storing unit 1 proceeds.

In the foregoing, continuous read of the same cluster is inhibited at the time of reading the program data by program storing unit 1. More specifically, memory access portion 1a of FIG. 1 compares and collates the destination cluster number CB stored in the applied data packet 43P' with the destination cluster number CB (this is stored in an internal buffer in advance) of the data packet 43P' which is applied immediately before. If the collation finds the destination cluster numbers to match with each other, the memory access portion inhibits access to memory bank portion 1b by the destination cluster number CB stored in the data packet 43P' input this time. This is done for avoiding continuous read of program data corresponding to cluster numbers which have not yet read (in the course of reading) because access to memory bank portion 1b is made on a basis of a destination cluster number CB.

Since program storing unit 1 is capable of reading five program data by each access for program data reading and supplying the data to operation processing unit 3 as described in the foregoing, the number of operation instructions supplied to operation processing unit 3 per unit time is larger than that in a conventional processor. Therefore, operation processing unit 3 has a reduced time for waiting for a subsequent input of an operation instruction after the end of an operation processing, thereby improving an operation processing rate as compared with the conventional processor. In addition, access for reading program data by program storing unit 1 is more effective than that in a conventional processor to an extent equivalent to the number of program data in each cluster. The present embodiment expects an access efficiency about five times a conventional efficiency according to calculation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor for processing information based on a data flow program including a plurality of information pairs of destination information and instruction information, the data driven information processor comprising:

program storing means for storing said data flow program divided into a plurality of program groups, the program storing means accessing said plurality of program groups in parallel based on one input destination information received by the program storing means and reading a plurality of information pairs corresponding to the destination information, each including destination information and instruction information, from each program group;

operation processing means for performing an operation processing concerning input data based on input instruction information in the input data and outputting data indicative of an operation result;

merging means for sequentially merging each of the plurality of information pairs read from said program storing means with data output from said operation processing means;

paired data detecting means for receiving the information pair and the data merged by said merging means and outputting at least one data corresponding to a same destination information together with an information pair including said same destination information; and supplying means for supplying destination information included in an information pair, the pair being from outputs of said paired data detecting means, to said program storing means and supplying the at-least-one-data and instruction information included in the information pair to said operation processing means.

2. The data driven type information processor according to claim 1, wherein;

said destination information includes address designation information related to accessing of said program storing means, and said program storing means includes:
memory means having a plurality of memory regions for storing said plurality of program groups, respectively;

access means for individually and simultaneously addressing the plurality of memory regions in said memory means based on said address designation information in one input destination information; and output means for receiving said destination information and instruction information in the subsequent order read from each of said plurality of memory regions by addressing by said access means and sequentially generating and outputting said information pairs.

3. The data driven type information processor according to claim 2, wherein:

said destination information further includes identification information for identifying destination information read from the plurality of program groups by said program storing means;

said supplying means further supplies identification information included in each of the information pairs, out of the outputs from said paired data detecting means, to said operation processing means;

said operation processing means outputs data indicative of said operation result together with input identification information; and said merging means has a plurality of input ports, receives the plurality of information pairs read from said program storing means through said input ports, respectively, receives, in parallel, the data output from said operation processing means and said identification information output together with the data through each of said input ports, and merges at least one of said information pairs and data received through each input port, out of said input ports, at which identification information in said information pair applied from said program storing means matches the identification information applied together with said data from said operation means.

4. The data driven type information processor according to claim 2, wherein said merging means has two output ports and outputs a merged information pair through one output port and merged data through the other output port in synchronization with each other.

5. The data driven type information processor according to claim 1, wherein:

said destination information includes identification information for identifying destination information read from the plurality of program groups by said program storing means;

said supplying means further supplies identification information to be included in an information pair, from said paired data detecting means, to said operation processing means;

said operation processing means outputs data indicative of said of said operation result together with input identification information; and said merging means has a plurality of input ports, receives the plurality of information pairs read from said program storing means thorough said input ports, respectively, receives in parallel data output from said operation processing means and said identification information output together with the data through each of said input ports, and merges an information pair and data received through each input port, out of said inputs ports, at which identification information in said information pair supplied from said program storing means matches identification information applied together with said data from said operation processing means.

6. The data driven type information processor according to claim 5, wherein said merging means further has two output a ports and outputs merged information pair through one output port and merged data through the other output port in synchronization with each other.

7. The data driven type information processor according to claim 1, wherein said merging means has two output ports and outputs a merged information pair through one output port and merged data through the other output port in synchronization with each other.

8. A data driven type information processor for processing information based on a data flow program including a plurality of pairs of destination information and instruction information, the data driven information processor comprising:

program storing means for storing said data flow program divided into a plurality of program groups, the program storing means accessing said plurality of program groups in parallel based on one input destination information received by the program storing means and reading out an information pair including destination information and instruction information from each of the program groups;

operation processing means for performing an operation processing related to input data based on input instruction information in the input data to output data indicative of an operation result; and controlling means for inputting each of the plurality of information pairs read from said program storing means together with corresponding data output from said operation processing means, for applying at least one data corresponding to a same information pair and instruction information included in the information pair to said operation processing means, and for applying the destination information included in the information pair to said program storing means.

9. In a data driven computer having a program storing unit storing a data flow program, a junction unit, a paired data detecting unit, a branch unit, and an operation processing unit, a method of reading program data out of the program storing unit comprising the steps of:

partitioning the program storing unit into N memory banks, N>1;

partitioning the data flow program into clusters,
each cluster including N pieces of data-flow-program data corresponding to the N memory banks, each set of N pieces including a plurality of substantially simultaneously executable data-flow-program data;
linking each cluster to each of the N memory banks by correspondence between the N memory banks and the N pieces of data-flow-program data in the cluster, respectively;
receiving a data packet into the program storing unit;
reading from the data packet a destination cluster number identifying a desired cluster; and
accessing substantially simultaneously all N pieces of data-flow-program data included in the desired cluster within the program unit, thereby achieving an N:1 read-out to memory-access ratio.

10. A method as in claim 9, the method further comprising the step of:

forming a data packet for each of the N pieces of cluster data-flow-program data.

11. A method as in claim 9, wherein:

upon being read, a cluster cannot be read again until after at least one memory access to another cluster occurs.

12. A method as in claim 9, wherein:

all N pieces of the destination cluster data-flow-program data are read in parallel.

13. In a data driven computer having a program storing unit apparatus storing a data flow program, a junction unit, a paired data detecting unit, a branch unit, and an operation processing unit, the program storing unit comprising:

a memory partitioned into N memory banks, N>1,
the memory storing the data flow program partitioned into clusters, each cluster including N pieces of data-flow-program data corresponding to the N memory banks, each set of N pieces including a plurality of substantially simultaneously executable data-flow-program data;
means for linking each cluster to each of the N memory banks by correspondence between the N memory banks and the N pieces of data-flow-program data in the cluster, respectively;

input means for receiving a data packet from the branch unit;

first reading means, responsive to the input means, for reading from the data packet a destination cluster number identifying a desired cluster; and second reading means, responsive to the first reading means, for accessing substantially simultaneously all N pieces of data-flow-program data included in the desired cluster within the memory, thereby achieving an N:1 read-out to memory-access ratio.

14. An apparatus as in claim 13, the further comprising:

a data packet generator forming a data packet for each of the N pieces of cluster data-flow-program data.

15. An apparatus as in claim 13, wherein:

the second reading means functions such that, upon reading a particular cluster, it cannot access the particular cluster again until after it performs at least one memory access to another cluster.

16. An apparatus as in claim 13, wherein:

the second reading means reads all N pieces of the destination cluster data-flow-program data are read in parallel.

* * * * *